(12) United States Patent
Remedios (10) Patent No.: US 7,441,268 B2
(45) Date of Patent: Oct. 21, 2008

(54) METHOD AND APPARATUS TO MANAGE EXCEPTIONS IN NETWORK PROCESSORS

(76) Inventor: Alwyn Dos Remedios, 174 Hillcroft Drive, Markham, Ontario (CA) L3S 1E8

( * ) Notice: Subject to any disclaimer, the term of this patent is extended or adjusted under 35 U.S.C. 154(b) by 917 days.

(21) Appl. No.: 10/863,661

(22) Filed: Jun. 8, 2004

(65) Prior Publication Data

US 2005/0270983 A1 Dec. 8, 2005

(51) Int. Cl.
*H04L 12/26* (2006.01)
(52) U.S. Cl. .......................... 726/13; 370/389; 370/411
(58) Field of Classification Search ................... 726/13; 370/252, 389, 411
See application file for complete search history.

(56) References Cited

U.S. PATENT DOCUMENTS

| | | | |
|---|---|---|---|
| 6,430,184 B1* | 8/2002 | Robins et al. | 370/392 |
| 7,260,840 B2* | 8/2007 | Swander et al. | 726/13 |
| 2002/0188871 A1* | 12/2002 | Noehring et al. | 713/201 |
| 2003/0105977 A1* | 6/2003 | Brabson et al. | 713/201 |
| 2003/0110393 A1* | 6/2003 | Brock et al. | 713/200 |
| 2003/0196081 A1* | 10/2003 | Savarda et al. | 713/153 |

\* cited by examiner

*Primary Examiner*—Kambiz Zand
*Assistant Examiner*—Yonas Bayou
(74) *Attorney, Agent, or Firm*—Blakely, Sokoloff, Taylor & Zafman LLP (57) ABSTRACT

A method and apparatus to process exception packets is described. A signature table, secondary table and a plurality of queues are used to store exception packets which match packets that are currently being handled, such that multiple requests for exception packet handling of the same or similar packets do not overwhelm the network processor.

33 Claims, 7 Drawing Sheets

METHOD AND APPARATUS TO MANAGE EXCEPTIONS IN NETWORK PROCESSORS

CROSS REFERENCE TO RELATED APPLICATIONS

Not Applicable.

STATEMENT REGARDING FEDERALLY SPONSORED RESEARCH

Not Applicable.

BACKGROUND

The Internet, as well as other networks, has become more and more complicated with increased bandwidth requirements, more users, and more elaborate uses. In order to handle these increased demands new protocols and network data types have been developed. Network Processors (NPs) are well known to those of ordinary skill in the art, and are used to perform tasks such as processing network packets, processing of network data streams, and processing of network objects to accomplish specific tasks.

Network Processors (NPs) can include, in addition to other resources, a number of processing elements to process packets and a general purpose or core processor on a single die. This core processor is typically used for processing exception packets. For example, if the network processor was performing a security policy database (SPD) function, the processing element could perform a quick lookup on a cached version of the SPD to determine the operations that the packet requires (e.g., drop, bypass or apply). This cached database is relatively quick to search but only contains a portion of the overall SPD. Therefore, it is possible to have the lookup miss in the cache and require a search of the full SPD database. This search tends to be long so it does not occur in the fast path using the processing element. Instead, the associated SPD core component (CC) on the core processor is used to perform the search of the full SPD database.

A problem arises when network traffic patterns cause many exceptions of the same or similar packets to the core processor before the result of the first packet is found. These similar packets will except to the core component and cause more searches to be performed. This results in network data from other hosts being dropped. These dropped packets need to be retransmitted and reprocessed by the network processor which in turn causes excessive strain on the network.

BRIEF DESCRIPTION OF THE DRAWINGS

The method and apparatus to manage exceptions in network processors will be more fully understood from the following detailed description taken in conjunction with the accompanying drawings, in which.

DETAILED DESCRIPTION

A method and apparatus for processing exception packets is described. The method and apparatus handles exception processing such that the exceptions do not overwhelm the network processor.

Figure 1:
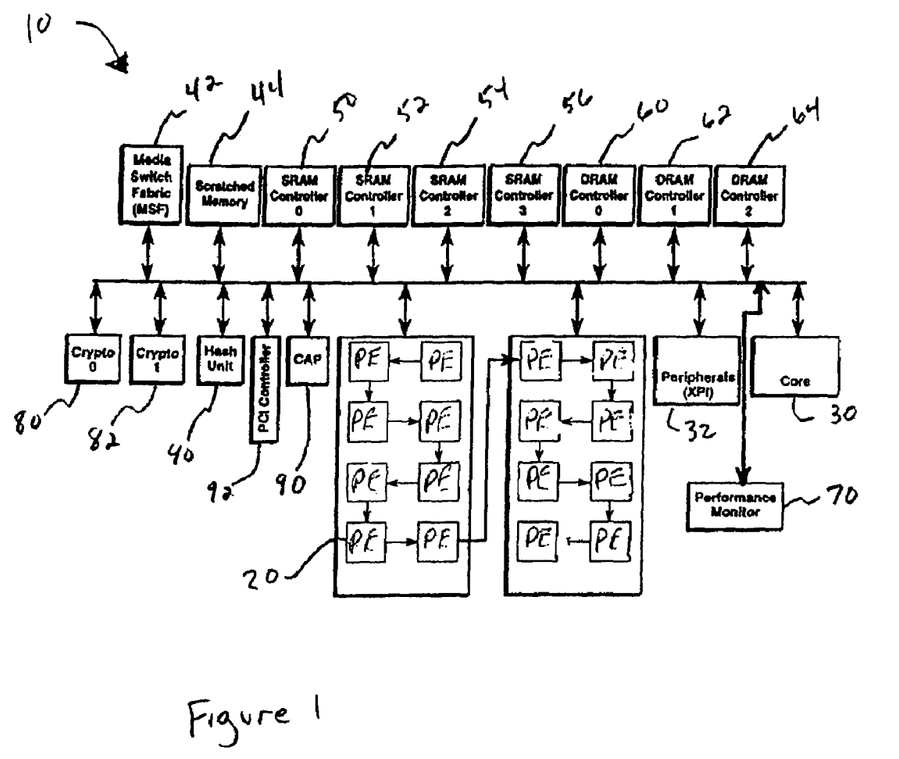
FIG. 1 comprises a block diagram of a network processor.

Referring to FIG. 1, a high-level block diagram of a particular embodiment of a network processor 10 for performing exception processing is shown. In this particular embodiment the network processor 10 includes a cluster of sixteen processing elements (MEs) 20. The processing elements 20 perform the main processing of the packets. The NP in this embodiment also contains a core processor 30. The core processor 30 is used to initialize and manage the network processor and is also used for certain network processing tasks such as processing exception packets. A hash unit 40 is used by the core processor 30 and the processing elements 20 to perform hash calculations (also referred to as hash functions). A hash function is a transformation that takes an input piece of data and returns a fixed-size string, which is called the hash value, and is representative of the original input piece of data.

The NP also includes a peripherals device 32 which serves as an interface to low-speed peripherals such as network devices and read only memory (ROM). A media switch fabric (MSF) interface 42 is used to interface to the switch fabric. The switch fabric interface includes the receive and transmit buffers used for communicating with the switch fabric. Also shown is a scratchpad memory 44 used for temporary storage.

Four static random access memory (SRAM) controllers 50, 52, 54 and 56 are used to interface to SRAM which is typically used for control information storage. Three dynamic random access memory (DRAM) controllers 60, 62 and 64 are used to interface to DRAM which is typically used for data buffer storage.

A performance monitor 70 is used to collect information which is used to analyze and tune performance of the NP. The network processor further includes two optional cryptographic units (referred to as "Crypto units") 80 and 82. These units are used to perform cryptographic processing on data. A control and status register access proxy (CAP) 90 is used to provide inter-processor communication features for processing element to processing element communications and for processing element to core processor communications. A peripheral component interconnect (PCI) controller 92 is used to connect to a host processor or to communicate with PCI compliant peripheral devices.

Figure 2:
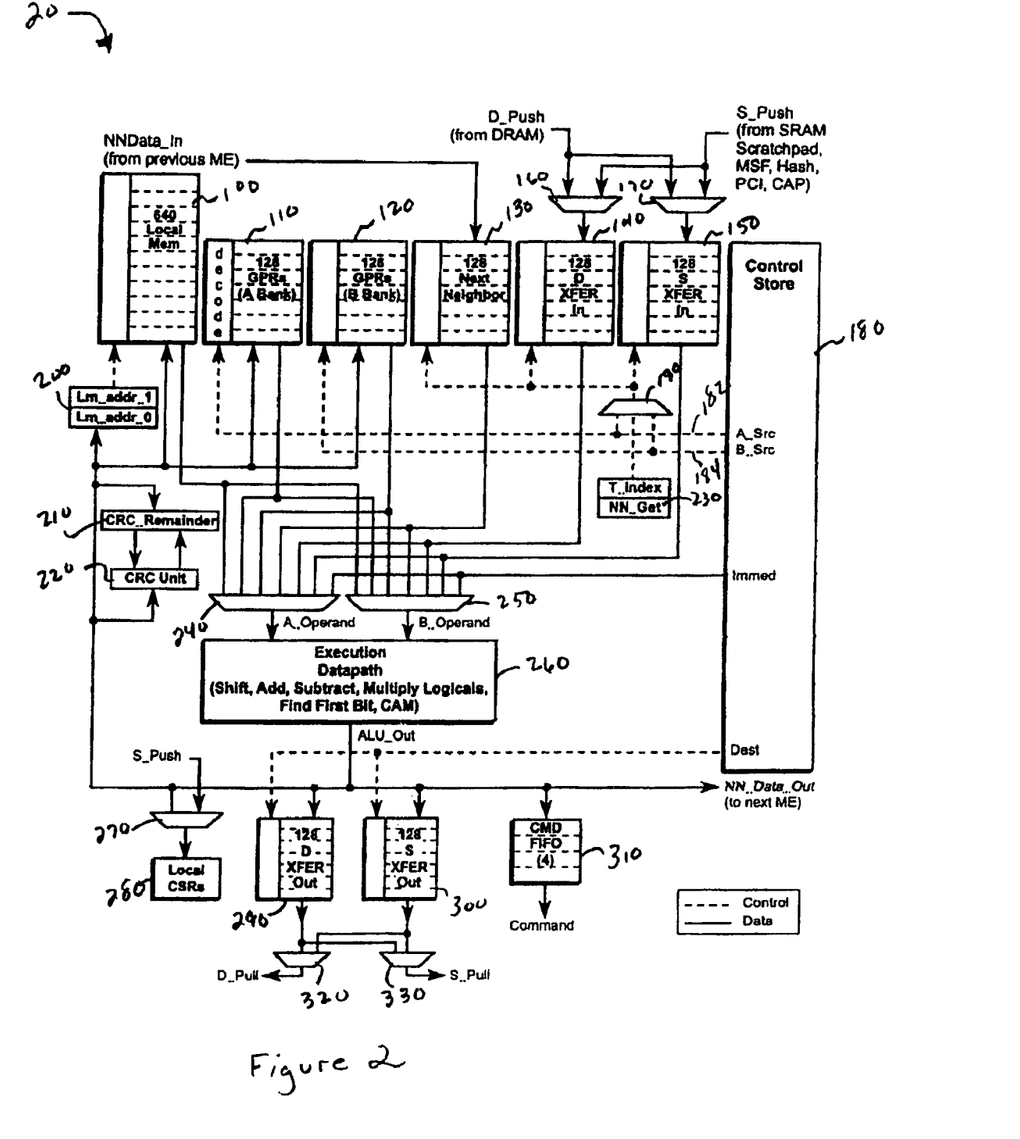
FIG. 2 comprises a block diagram of a processing element.

As described above the NP contains several processing elements. Referring now to FIG. 2, a block diagram of a particular embodiment of an processing element 20 for performing exception processing is shown. The processing element 20 includes a local memory 100, general purpose register (GPR) banks 110 and 120, a next neighbor storage 130 receiving data from another processing element, a first storage device 140 and a second storage device 150. The inputs to the first storage device 140 and the second storage device 150 are fed by multiplexors 160 and 170 respectively. The multiplexors are used to select between data from the DRAM or from one of the SRAM, scratchpad, MSF, hash unit, PCI or CAP of the NP.

Processing element 20 includes a control store 180 which configures the processing element to perform the desired function. The control store 180 provides control signals to the GPRs 110 and 120, the next neighbor register 130, the first storage device 140 and the second storage device 150 to determine the inputs which will be supplied to the execution datapath element 260. Multiplexor 190 is used to select an entry of the next neighbor register 130, first storage device 140 and second storage device 150. The inputs to multiplexor 190 are the first output signal 182 and second output signal 184 from control store 180 and an output from buffer 230. Multiplexor 240 is used to select a first input to the execution datapath element 260. Multiplexor 250 is used to select a second input to the execution datapath element 260.

The execution datapath element 260 performs a function on the data provided at the inputs from multiplexers 240 and 250. This execution may include, but is not limited to, shift, add, subtract, multiply, logical functions and the like. The output of the execution datapath element 260 is provided to multiple devices within the processing element.

The output of the execution datapath element 260 is provided to a cyclic redundancy check (CRC) unit 720, the output of which is provided to a CRC remainder register 710. The output of the execution datapath element 760 is also provided to local memory (LM) address register 200. The output of LM register 200 is coupled to local memory storage 100.

The output of execution datapath element 260 is also provided to multiplexor 270 as is data from one of the SRAM, scratchpad, MSF, hash unit, PCI or CAP of the NP. The output of the multiplexor 270 is provided to local control and status registers (CSRs) 280. The output of the execution datapath element 260 is also provided to third storage device 290 and fourth storage device 300. The outputs of the third storage device 290 and the fourth storage device 300 are provided to multiplexors 320 and 330. Multiplexor 320 provides data from the processing element to the DRAM, and multiplexor 330 provides data to one or more of one of the SRAM, scratchpad, MSF, hash unit, PCI or CAP of the NP. The output of the execution datapath element 260 is further provided to command first in first out (CMD FIFO) 310.

Figure 3:
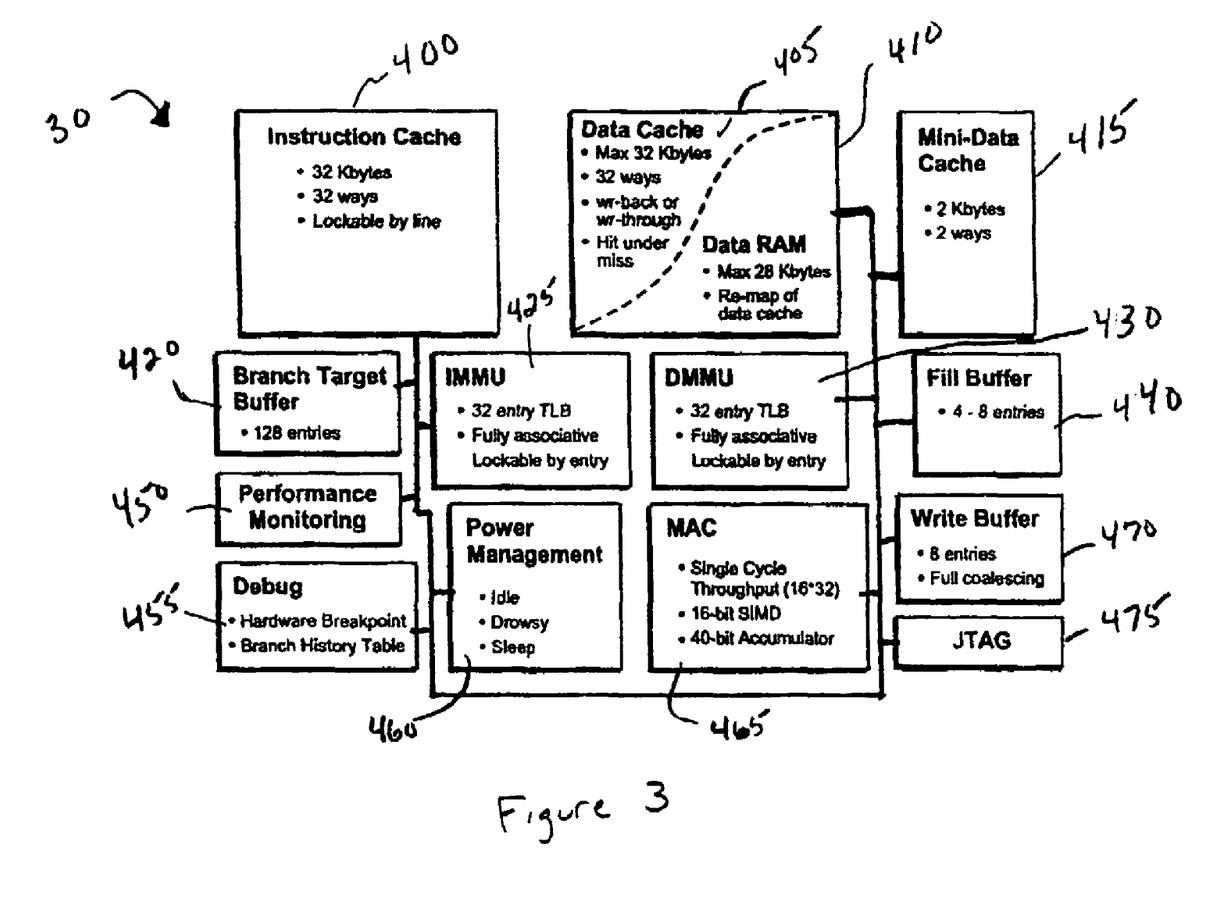
FIG. 3 comprises a block diagram of a core processor.

Referring now to FIG. 3, a block diagram of a particular embodiment of a core processor 30 for performing exception processing is shown. The core processor 30 includes an instruction cache 400 that stores instructions, and when a request for an instruction misses in the instruction cache, a read request is sent to external memory.

A data cache 405 is used to store data and supports both write-through caching as well as write-back caching. Write-through caching refers to a write from the processor destined to memory written to both the cache and to main memory. Write-back caching refers to a write from the processor destined to main memory written only to the cache, and main memory is only updated with the cache contents when a read (by another device) from the memory location which would have been modified by the intended write to memory is detected. A portion of the data cache 405 can be reconfigured under processor control to perform as a data random access memory (RAM) 410. Additionally, a mini-data cache 415 is also shown, the mini-data cache having less storage than the data cache.

A branch target buffer (BTB) 420 is used to predict the outcome of branch instructions. The BTB 420 provides storage for the target address of a branch instruction and predicts the next address to present to the instruction cache when the current instruction address is that of a branch instruction.

An instruction memory management unit (IMMU) 425 and a data memory management unit (DMMU) 430 are used to accelerate virtual address to physical address translations. Also included as part of the memory management function are the fill buffer 440 and the write buffer 470. The fill buffer 440 is used to perform cache fill operations. The write buffer 470 is used to combine writes to external memory.

The core processor 30 includes a performance monitoring element 450. The performance monitoring element 450 contains logic that is used to measure parameters such as cache efficiency, to detect system bottlenecks and to reduce the overall latency of programs executing on the core processor 30.

A debug element 455 supports software debugging through the use of multiple instruction address breakpoint registers, a data address breakpoint register, a data address/mask breakpoint register and a trace buffer. Power management block 460 incorporates a power and clock management unit that assists in controlling clocking and in managing power.

A multiply/accumulate unit 465 supports early termination of multiplies/accumulates to sustain throughput. Testability of the core processor is supported by the joint test action group (JTAG) device 475. The JTAG device 475 supports internal test logic as well as built-in self test, boundary scan tests and scan testing.

Figure 4:
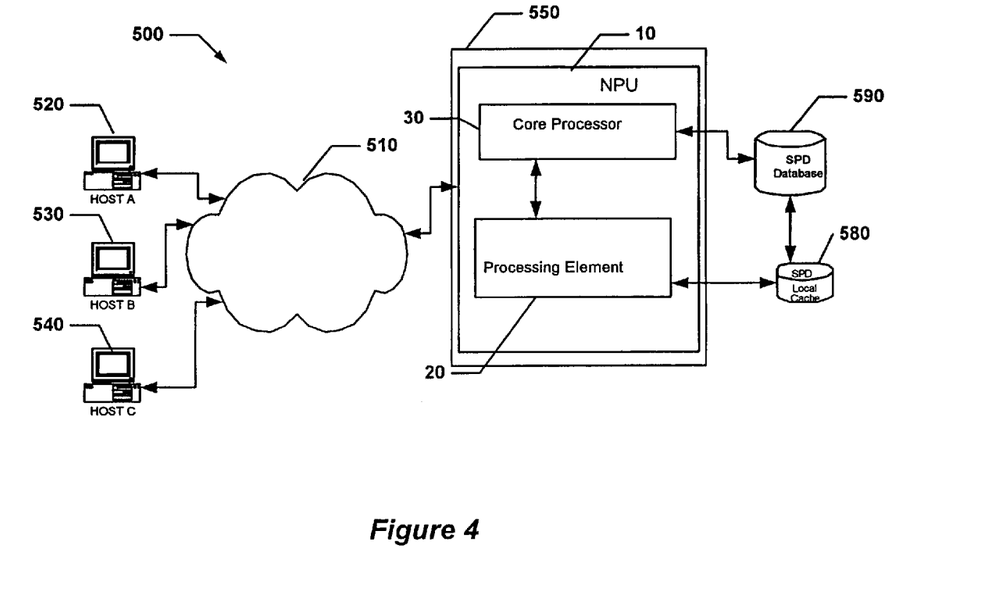
FIG. 4 comprises a block diagram of the apparatus for performing exception management.

Referring now to FIG. 4, a network environment 500 is shown for performing exception processing. The network environment 500 includes a plurality of host systems 520, 530 and 540, a network 510 (such as the Internet) and a router 550. The router 550 includes an NP 10 that includes a core processor 30 and a processing element (PE) 20. An external SPD database 590 and local cache 580 are shown in communication with the NP 10. In alternative embodiment, one or both of the SPD database and local cache are contained within the NPU and/or router.

In a scenario wherein host system (e.g. host system 520) bursts network traffic across Internet 110 to the NPU 20 in the router 550, this traffic is destined to the same endpoint. Since the SPD local cache 580 does not contain a cache entry for the packet(s), the packets in the burst are excepted to the SPD core component (CC). This prevents packets from other systems (e.g. host 530 and host 540) from excepting to core processor 30. Instead, these packets are dropped and need to be retransmitted thereby drastically lowering overall throughput through the network processor and greatly increasing network traffic.

The present method and apparatus to manage exceptions in a network processor is able to prevent one or more hosts from overwhelming the NP when the packets map to the same SPD cache entry. The present method and apparatus to manage exceptions also allows packets to be queued up to a defined high watermark (a maximum number of pending packets) when an entry is being handled by the SPD CC. This maximizes the amount of time permitted for the search in order to prevent the packets from needing to be retransmitted on the network, as well as limiting the number of outstanding searches that the SPD CC performs before new packets are dropped.

Figure 5:
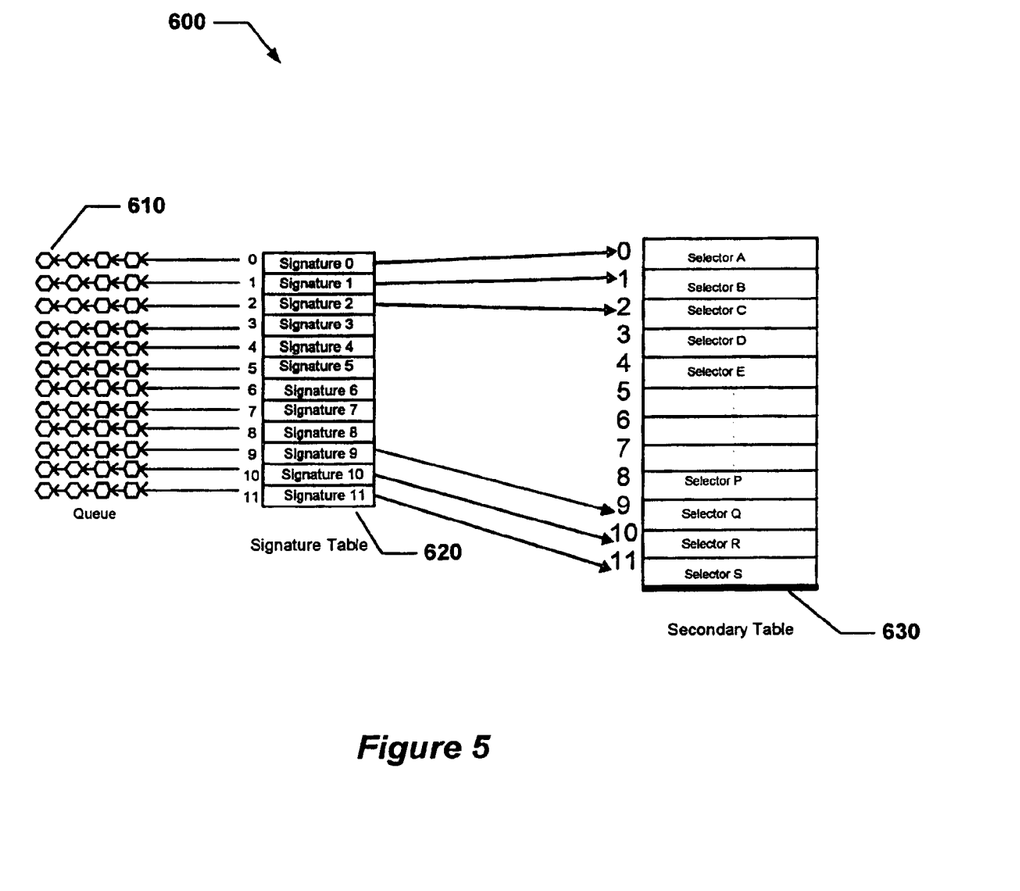
FIG. 5 comprises a block diagram showing an exemplary exception mechanism.

Referring now to FIG. 5, the present exception mechanism 600 is shown to include a signature table 620, a secondary table 630 and a number of queues 610. The exception mechanism 600 may be included as part of the core processor 30, or may be located external to core processor 30 within network processor 10. The signature table 620 contains signatures which are values used to indicate that the packet may be in the cache (a potential cache hit) while the secondary table 630 contains the full cache entry which may include other pertinent packet information. There is a one-to-one correlation between a signature table entry's location (or index) and the secondary table entry's location (or index). For example, the fifth element in the signature table 620 is associated with the fifth element in the secondary table 630.

The number of entries in the signature table (shown as eleven entries in FIG. 5) is predefined and dictates the number outstanding searches that are allowed to take place by the core component. Factors which are used to determine the number of entries the signature table can contain include the speed of the NP, the rate the packets are received at, and the like.

In one embodiment, the signature (S) for the signature table is obtained by hashing information within the packet. The hashing function may be accomplished by software or by use of hash unit 40 in the NP. For example, the signature for a packet could be obtained by hashing an IP tuple of the packet, wherein the IP tuple is comprised of the IP destination, the IP source, the IP protocol, the IP source port and the IP destination port for the packet. This hashed signature for the packet is then stored in an entry of the signature table 620. The corresponding secondary table entries are provided using an IP selector comprised of the IP destination, IP source, IP protocol, IP source port, and IP destination port. The secondary table is used to distinguish between different packets which may have the same signature.

In addition, the exception mechanism contains queues 610 associated with each signature table entry. Each queue is used to store other packets with the same signature while the core component updates the local SPD cache in the processing element. Each queue can hold up to a predefined number of packets (referred to as the high watermark) before subsequent packets with the same signature are dropped. Factors which are used to determine the number of entries the queue can contain include the speed of the NP, the rate the packets are received at, and the like.

When an SPD entry is not found for a packet by the processing element, the present exception mechanism is invoked instead of the packet being immediately excepted to the SPD CC. The exception mechanism checks the signature table to determine if an SPD CC search is already invoked for the entry. If a matching entry is not found, the exception mechanism creates a signature entry for the packet in the table so other packets with the same signature will not cause an exception to the core processor.

Figure 6:
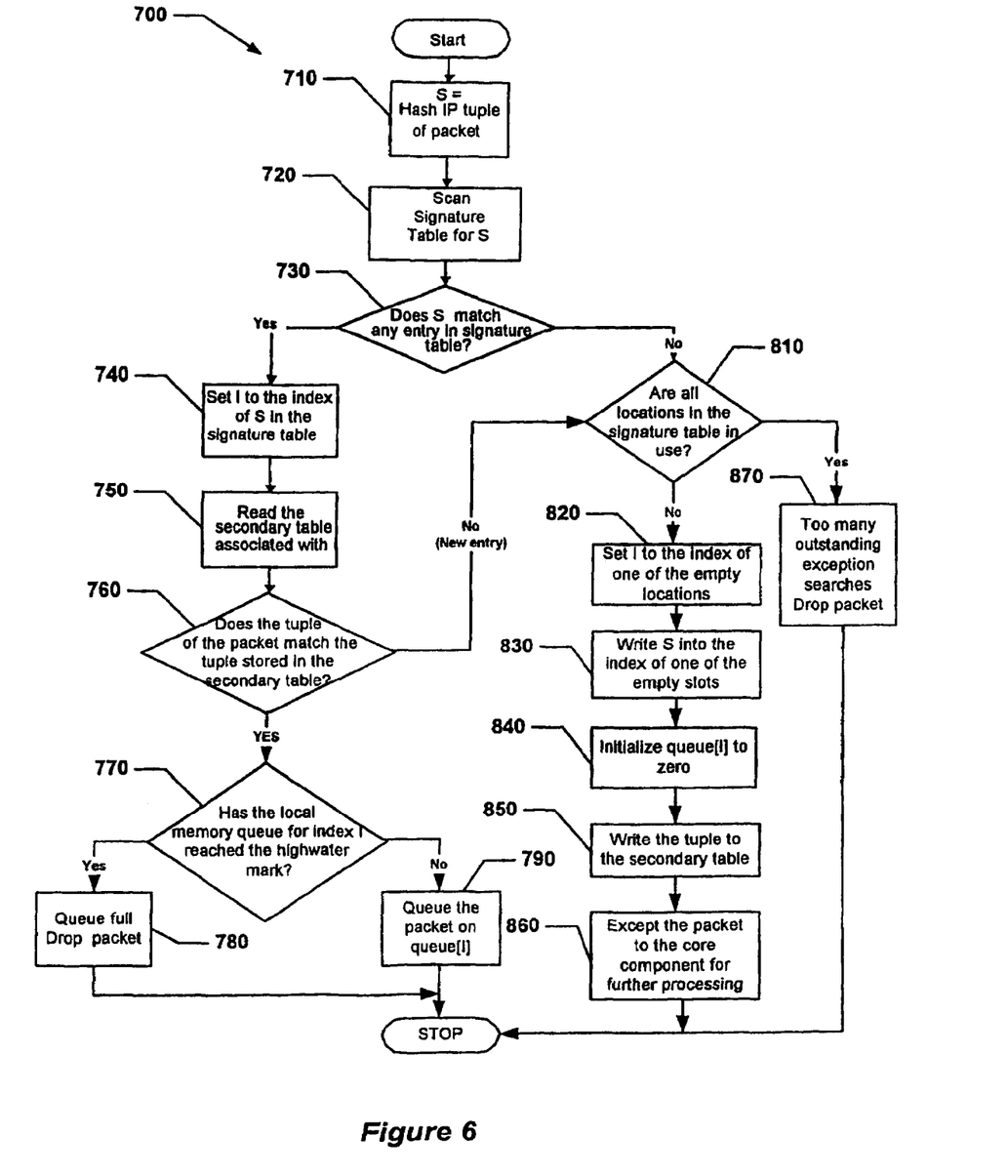
FIG. 6 comprises a flow chart for performing exception management.
Figure 7:
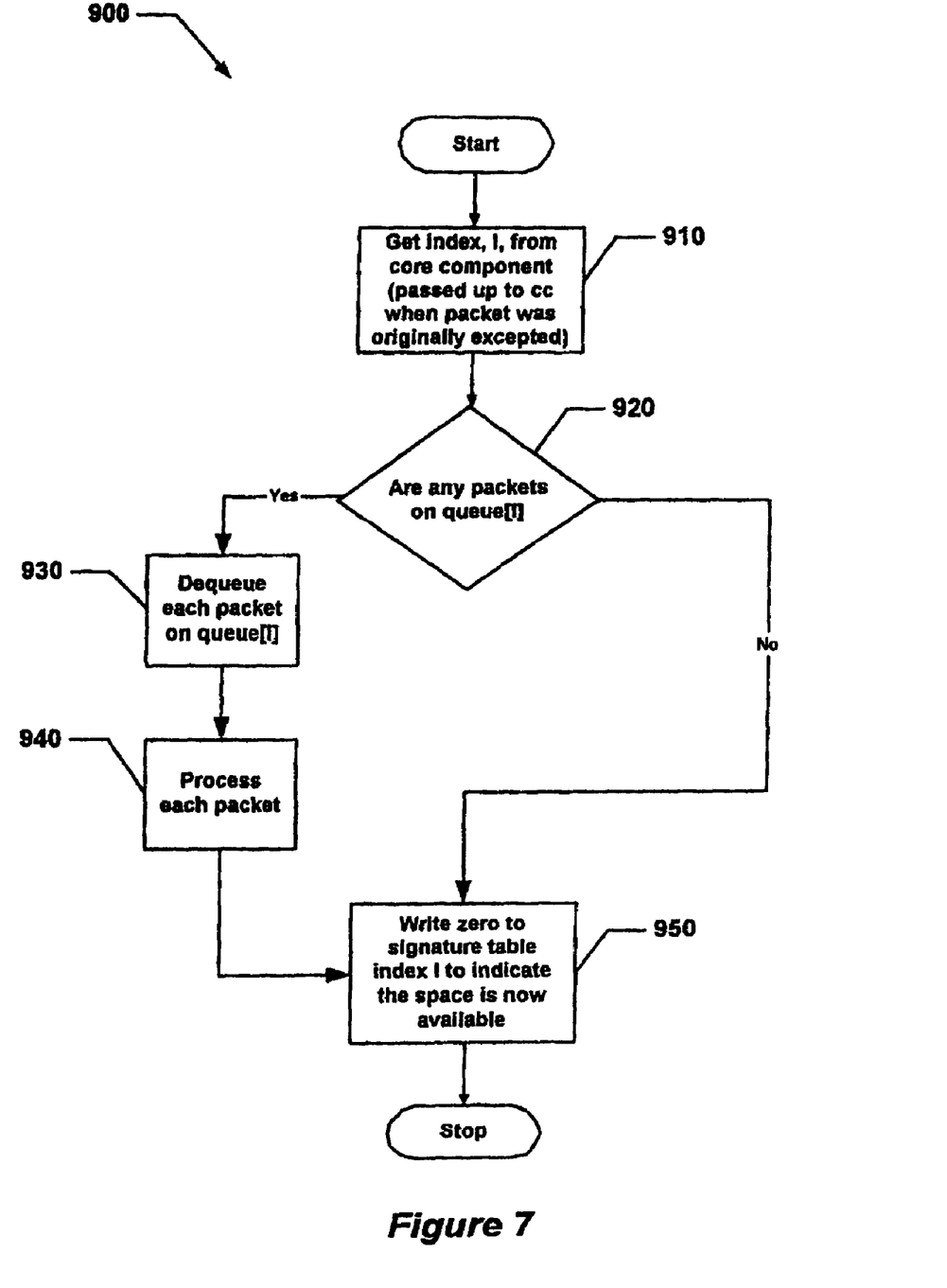
FIG. 7 comprises a flow chart for dequeuing packets.

Flow charts of the presently disclosed methods are depicted in FIGS. 6 and 7. The rectangular elements are herein denoted "processing blocks" and represent computer software instructions or groups of instructions. The diamond shaped elements are herein denoted "decision blocks" and represent computer software instructions or groups of instructions which affect the execution of the computer software instructions represented by the processing blocks.

Alternatively, the processing and decision blocks can be performed by other circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present method and apparatus to manage exceptions in network processors. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the method and apparatus to manage exceptions in network processors. Thus, unless otherwise stated the blocks described below are unordered meaning that, when possible, the blocks can be performed in any convenient or desirable order.

Referring now to FIG. 6, a particular method 700 for excepting packets to the core component is shown. The process 700 starts and processing block 710 is executed. Processing block 710 provides the signature (S) for the packet, for example by performing a hash function on an IP tuple of the packet.

Processing block 720 is performed next wherein the signature table is scanned for a match of the signature of the current packet. In decision block 730 a determination is made regarding whether the signature for the present packet matched an entry in the signature table. A match indicates that an SPD lookup for this packet may already be underway. When a match is encountered, then processing block 740 is performed next. When a match is not found between the signature S and an entry in the signature table processing continues at decision block 810.

An index variable I is set to the index of S in the signature table in processing block 740. This is done to account for the case wherein different packets may have the same signature S, and a further check is required to ensure that the packet has the same IP tuple as the packet being excepted.

In processing block 750 the secondary table entry associated with index I is read. The secondary table contains the IP tuple of the packet. Since there is a one-to-one correlation between the hashed signature S in the signature table with entries in the secondary table, the index points to the appropriate IP tuple for the packet.

Decision block 760 is executed next, wherein a determination is made whether the IP tuple of the packet matches the IP tuple stored in the secondary table. If there is not a match, then processing continues with decision block 810. When there is a match, indicating that there is a pending SPD search taking place for that packet, then processing continues at decision block 770.

In decision block 770 a determination is made regarding whether the queue for index entry I has reached the highwater mark. When the queue for index entry I has reached the highwater mark, then the processing block 780 is performed wherein the packet is dropped. When the highwater mark of the queue has not been reached, then the packet is placed in the queue and the process stops.

When it has been determined that the present packet is new as far as having an SPD search performed, as determined in block 730 or in block 760, then decision block 810 is preformed. In decision block 810 a determination is made whether the signature table is full. When the signature table is full, processing proceeds with processing block 870. When there are available locations in the signature table, the method continues with processing block 820.

The index I is set to one of the empty locations in the signature table. Processing block 830 writes the signature S into the empty location of the signature table indicated by index I.

Processing block 840 initializes the queue associated with the entry to zero. The IP tuple of the packet is written to the secondary table in processing block 860. This table functions as a final check that the same packet already has an SPD search being performed on it.

In processing block 860 the packet is excepted to the core component of the core processor for further processing. A current search is not being conducted for this packet, thus the exception will be performed. Any subsequent packets having the same IP tuple will match the signature table entry, and will be queued until the result of this exception process is complete.

The packet is dropped when there are there are too many outstanding exception packets being processed, as disclosed in processing block 870. The process then ends.

Once the core component completes processing the excepted packet, it updates the SPD cache with new data and informs the processing element which index is associated with the packet. This index was originally sent to the core component with the exception message. The processing element then performs the process shown in FIG. 7 to process packets that are queued on the index.

It is understood that FIG. 7 set forth an exemplary embodiment having an index variable and pointer function. A wide range of alternative embodiments using mechanisms other than index variables will be readily apparent to one of ordinary skill in the art.

Referring now to FIG. 7, a particular process 900 for dequeuing queued exceptions packets is shown. The index I is obtained from the core component in processing block 910.

Decision block 920 determines whether there any packets queued for this index. When there are no packets queued, then processing continues at processing block 950. When there are packets queued for the index I, then processing block 930 is performed.

In processing block 930 packets on the queue are dequeued. Processing block 940 is then performed wherein each packet is processed. In one embodiment the packets may be dequeued all at once, then processed. In another embodiment, one packet at a time is dequeued and processed, then another packet is dequeued and processed until the queue has been emptied.

Following completion of either processing block 940 or when the determination at decision block 920 is that there are no packets on the queue associated with the index I, processing block 950 is performed. In processing block 950 the signature table index I is set to zero to indicate that the entry is now available. The process then ends.

The present method and apparatus to manage exceptions focuses on SPD exception handling but it should be understood that the concepts are also applicable to other types of packet exception management.

Having described exemplary embodiments of the method and apparatus to manage exceptions in network processors, it will now become apparent to those of ordinary skill in the art that other embodiments incorporating these concepts may be used. Additionally, the software included as part of the present method and apparatus may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that the method and apparatus to manage exceptions in network processors should not be limited to the described embodiments but rather should be limited only by the spirit and scope of the appended claims.

What is claimed is:

1. A method to manage packet processing exceptions, comprising:
   receiving a packet;
   searching a security policy database (SPD) cache for an SPD cache entry corresponding to the packet; and
   invoking an exception mechanism when the SPD cache entry for the packet is not found in the SPD cache including:
   searching a signature table for a signature table entry corresponding to the packet to determine if a search of a security policy database is being performed for another packet mapping to the same SPD cache entry as the received packet;
   searching a secondary table for a secondary table entry corresponding to the signature table entry to determine if information in the packet matches an entry in the secondary table when the packet signature matches an entry in the signature table; and
   attempting to queue the packet in a queue if the signature table entry is found.

2. The method according to claim 1, wherein the secondary table entry uniquely identifies the packet.

3. The method according to claim 1, wherein there is a one-to-one correspondence between the queue and the signature table entry.

4. The method according to claim 1, further including attempting to write an entry in the signature table for the packet when the signature table entry for the packet is not found in the signature table.

5. The method according to claim 4, dropping the packet when the signature table is full.

6. The method according to claim 4, further including excepting the packet to a core processor for further processing after writing the entry for the packet in the signature table.

7. The method according to claim 1, wherein the signature table entry corresponds to an IP-tuple.

8. The method according to claim 1, further including dropping the packet if the queue is full.

9. The method according to claim 1, wherein the signature table entry corresponds to a hashed signature for the packet.

10. A method to manage exceptions comprising:
    identifying a packet requiring exception handling;
    generating a packet signature for the packet;
    checking a signature table to determine if said packet signature matches an entry in said signature table;
    checking a secondary table to determine whether information in said packet matches an entry in said secondary table when said packet signature matches an entry in said signature table;
    queuing the packet for exception handling when information in said packet matches an entry in said secondary table; and
    storing said packet signature in said signature table, storing said information in said packet in said secondary table, and performing exception handling of said packet when said packet signature does not match an entry in said signature table.

11. The method of claim 10 wherein said generating a signature for the packet comprises hashing a tuple of the packet.

12. The method of claim 11 wherein said tuple comprises an IP tuple of said packet.

13. The method of claim 12 wherein said IP tuple includes one or more of an IP destination, an IP source, an IP protocol, an IP source port and an IP destination port.

14. The method of claim 11 further comprising:
    obtaining an index for said packet, said index indicating an entry of said signature table;
    determining whether packets are queued on a queue associated with said entry of said signature table;
    dequeuing said packets, processing said packets, and indicating said entry is available for other packets when there are packets queued on said queue; and
    indicating that said entry is available for other packets when there are not packets on said queue.

15. An article, comprising:
a storage medium having stored thereon instructions that when executed by a machine result in the following:
receiving a packet;
searching a security policy database (SPD) cache for an SPD cache entry corresponding to the packet; and
invoking an exception mechanism when the SPD cache entry for the packet is not found in the SPD cache including:
searching a signature table for a signature table entry corresponding to the packet to determine if a search of a security policy database is being performed for another packet mapping to the same SPD cache entry as the received packet;
searching a secondary table for a secondary table entry corresponding to the signature table entry to determine if information in the packet matches an entry in the secondary table when the packet signature matches an entry in the signature table; and
attempting to queue the packet in a queue if the signature table entry is found.

16. The article according to claim 15, wherein the secondary table entry uniquely identifies the packet.

17. The article according to claim 15, wherein there is a one-to-one correspondence between the queue and the signature table entry.

18. The article according to claim 15, further including instructions to attempt to write an entry in the signature table for the packet when the signature table entry for the packet is not found in the signature table.

19. The article according to claim 18, further including instructions to drop the packet when the signature table is full.

20. The article according to claim 18, further including instructions to except the packet to a core processor for further processing after writing the entry for the packet in the signature table.

21. A network processor, comprising:
at least one processing element;
a core processor in communication with said at least one processing element; and
an exception handling mechanism in communication with said at least one processing element and said core processor, wherein the exception handling mechanism is invoked after a failed search of a security policy database (SPD) cache for an SPD cache entry corresponding to a received packet, the exception handling mechanism including:
a signature table containing respective signature table entries corresponding to packets not found in the SPD cache, the signature table to be searched to determine if a search of a security policy database is being performed for another packet mapping to the same SPD cache entry as the received packet;
a secondary table containing entries corresponding to the signature table entries, the secondary table to be searched to determine if information in the packet matches an entry in the secondary table when the packet signature matches an entry in the signature table; and
a queue to hold packets for which entries in the signature table were not found.

22. The processor according to claim 21, wherein the secondary table includes entries with a one-to-one correspondence with entries in the signature table, and wherein the secondary table entries uniquely identify each packet.

23. The processor according to claim 21, wherein the exception handling mechanism attempts to write an entry in the signature table for the packet when the signature table entry for the packet is not found in the signature table.

24. A network processor comprising:
at least one processing element;
a core processor in communication with said at least one processing element; and
an exception handling mechanism in communication with said at least one processing element and said core processor comprising:
a signature table having at least one entry, said at least one entry to store at least one signature of an exception packet; and
a secondary table having at least one entry, said at least one entry to store information contained in said exception packet, and wherein said processor performs exception packet handling by executing instructions which result in the following:
identifying a packet requiring exception handling and generating a packet signature for the packet;
checking a signature table to determine if said packet signature matches an entry in said signature table;
checking a secondary table to determine whether information in said packet matches an entry in said secondary table when said packet signature matches an entry in said signature table;
queuing the packet for exception handling when information in said packet matches an entry in said secondary table; and
storing said packet signature in said signature table, storing said information said packet in said secondary table, and performing exception handling of said packet when said packet signature does not match an entry in said signature table or information in said packet does not match an entry in said secondary table.

25. The processor of claim 24, wherein said generating a signature for the packet comprises hashing a tuple of the packet.

26. The processor of claim 25 wherein said tuple comprises an IP tuple of said packet.

27. The processor of claim 26 wherein said queuing the packer for exception handling further comprises dropping said packet when at least one entry of said signature table is not available.

28. A network forwarding device comprising:
a switch fabric;
at least one line card to forward data to ports of the switching fabric;
the at least one line card including a network processor having at least one processing element in communication with said switch fabric;
a core processor in communication with at least one of said at least one processing element; and
an exception handling mechanism in communication with said at least one processing element and said core processor, wherein the exception handling mechanism is invoked after a failed search of a security policy database (SPD) cache for an SPD cache entry corresponding to a received packet, the exception handling mechanism including:
a signature table containing respective signature table entries corresponding to packets not found in the SPD cache, the signature table to be searched to determine if a search of a security policy database is being performed for another packet mapping to the same SPD cache entry as the received packet;

a secondary table containing entries corresponding to the signature table entries, the secondary table to be searched to determine if information in said packet matches an entry in said secondary table when said packet signature matches an entry in said signature table; and a queue to hold packets for which entries in the signature table were not found.

29. The device according to claim 28, wherein the secondary table includes entries with a one-to-one correspondence with entries in the signature table, and wherein the secondary table entries uniquely identify each packet.

30. The device according to claim 29, wherein the exception handling mechanism attempts to write an entry in the signature table for the packet when the signature table entry for the packet is not found in the signature table.

31. The device of claim 30 wherein a respective signature table entry bas a one-to-one correspondence to a respective secondary table entry.

32. The device of claim 29 further comprising at least one queue, said at least one queue corresponding to said at least one entry of said signature table, said at least one queue to store exception packets having a same signature as said signature stored in said entry of said signature table.

33. The device of claim 29 further comprising a hash unit in communication with said at least one processing element and said core processor, said hash unit to hash information related to said exception packet to provide said signature of said exception packet.

* * * * *

UNITED STATES PATENT AND TRADEMARK OFFICE
CERTIFICATE OF CORRECTION

PATENT NO.       : 7,441,268 B2
APPLICATION NO.  : 10/863661
DATED            : October 21, 2008
INVENTOR(S)      : Remedios

Page 1 of 1

It is certified that error appears in the above-identified patent and that said Letters Patent is hereby corrected as shown below:

In column 12, at line 2, delete "bas" and insert --has--.

Signed and Sealed this

Tenth Day of March, 2009

JOHN DOLL
*Acting Director of the United States Patent and Trademark Office*